(12) United States Patent
Grant et al.

(10) Patent No.: US 8,630,372 B2
(45) Date of Patent: *Jan. 14, 2014

(54) METHOD AND APPARATUS FOR DETECTING A PLURALITY OF SYMBOL BLOCKS USING A DECODER

(75) Inventors: Stephen Grant, Pleasanton, CA (US); Gregory E. Bottomley, Cary, NC (US); Florent Munier, Gothenburg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,191

(22) Filed: Aug. 24, 2012

(65) Prior Publication Data

US 2012/0321022 A1  Dec. 20, 2012

Related U.S. Application Data

(63) Continuation of application No. 12/628,360, filed on Dec. 1, 2009, now Pat. No. 8,290,091.

(51) Int. Cl.
*H04L 27/06* (2006.01)
*H04L 27/14* (2006.01)

(52) U.S. Cl.
USPC .......................................... 375/324; 375/340

(58) Field of Classification Search
USPC ............... 375/260, 262, 265, 324, 340, 341; 714/794, 795
See application file for complete search history.

(56) References Cited

U.S. PATENT DOCUMENTS

| | | | |
|---|---|---|---|
| 6,798,852 B2 * | 9/2004 | Khayrallah et al. | 375/341 |
| 6,831,574 B1 * | 12/2004 | Mills et al. | 341/50 |
| 7,339,980 B2 * | 3/2008 | Grant et al. | 375/148 |
| 2004/0132416 A1 * | 7/2004 | Yee | 455/82 |
| 2004/0174939 A1 | 9/2004 | Wang | |
| 2004/0213360 A1 * | 10/2004 | McElwain | 375/340 |
| 2005/0094742 A1 | 5/2005 | Yee | |
| 2005/0157806 A1 | 7/2005 | Walton et al. | |
| 2007/0147481 A1 | 6/2007 | Bottomley et al. | |
| 2008/0298491 A1 | 12/2008 | Jung et al. | |
| 2009/0116590 A1 | 5/2009 | Lee et al. | |

(Continued)

FOREIGN PATENT DOCUMENTS

WO   WO 2009/105020 A1   8/2009

OTHER PUBLICATIONS

Bottomley: "Block equalization and generalized MLSE arbitration for the HSPA WCDMA uplink", IEEE VTC Fall 2008, Calgary, Canada, Sep. 21-24, 2008, the whole document.

(Continued)

*Primary Examiner* — Young T. Tse

(57) ABSTRACT

Teachings presented herein offer a technique for using a demodulator to improve a demodulation process. For example, a demodulation unit according to an embodiment of the present invention may be a multi-stage demodulator and may include: a demodulator configured to receive a baseband signal and configured to produce modem bit likelihood values based on the received baseband signal; a decoder configured to receive and process the modem bit likelihood values to produce improved modem bit likelihood values; a candidate value generator configured to produce, based on the improved modem bit likelihood values, candidate symbol values for a group of one or more symbols; and a detector configured to receive the baseband signal and the candidate symbol values and configured to produce one of (a) final modem bit estimates and (b) candidate symbol values for a group of symbols.

13 Claims, 12 Drawing Sheets

(56) References Cited

U.S. PATENT DOCUMENTS

| | | |
|---|---|---|
| 2009/0213907 A1* | 8/2009 | Bottomley et al. ............ 375/148 |
| 2009/0213908 A1* | 8/2009 | Bottomley .................... 375/148 |
| 2010/0232549 A1* | 9/2010 | Oizumi ........................ 375/341 |
| 2011/0075767 A1* | 3/2011 | Bottomley et al. ............ 375/340 |
| 2011/0075769 A1* | 3/2011 | Bottomley .................... 375/341 |

OTHER PUBLICATIONS

Li et al.: "Reduced-complexity detection algorithms for systems using multi-element arrays", in Proc. IEEE Globecom, San Francisco, Nov. 17-Dec. 1, 2000, pp. 1072-1076.

Tarokh et al.: "Combined array processing and space-time coding", IEEE Trans. Info. Theory, val. 45, No. 4, pp. 1121-1128, May 1999.

Williamson et al.: "Block decision feedback equalization", IEEE Trans. Commun., val. 40, No. 2, pp. 255-264, Feb. 1992.

Odling, et al. "Making MLSD Decisions by Thresholding the Matched Filter Output", IEEE Trans. Commun., vel. 48, No. 2, Feb. 2000, pp. 324-332.

Y.L.C. de Jong, et al. "Iterative Tree Search Detection for MIMO Wireless Systems", IEEE Trans. Commun., vel. 53, No. 6, Jun. 2005, pp. 930-935.

* cited by examiner

METHOD AND APPARATUS FOR DETECTING A PLURALITY OF SYMBOL BLOCKS USING A DECODER

CROSS-REFERENCE TO RELATED APPLICATION

This application is a continuation of patent application Ser. No. 12/628,360, filed on Dec. 1, 2009, now U.S. Pat. No. 8,290,091 which is incorporated by reference herein in its entirety.

TECHNICAL FIELD

The present invention relates generally to symbol block detection, and particularly to using a decoder to improve symbol block detection.

BACKGROUND

Direct Sequence Code Division Multiple Access (DS-CDMA) systems, such as High Speed Packet Access (HSPA) services in Wideband CDMA (WCDMA) and similar packet services in CDMA2000, transmit a sequence of symbols by modulating the symbols upon a high chip-rate CDMA code. Preferably, the CDMA code is orthogonal to the codes used to transmit other symbol sequences, allowing the receiver to separate out its desired symbol sequence from the others by correlating with a particular code.

To increase data rates for a given receiver, the receiver may be assigned to receive multiple symbol sequences sent in parallel using different orthogonal codes (which may or may not have the same spreading factor). In this case, the receiver receives a sequence of symbol blocks, where each symbol block comprises a combination of two or more symbols. For example, in HSPA, the highest uplink data rate permits a receiver to receive blocks of three 16-QAM symbols sent over four chip periods.

Yet when a sequence of symbol blocks is received over a dispersive channel, destroying orthogonality between codes, intersymbol interference (ISI) results between time-successive symbol blocks and between the symbols within each symbol block. In other words, with dispersive transmission channels, a symbol within any given symbol block in a time-wise sequence of symbol blocks suffers interference arising from other symbols in the same block, and interference arising from other symbol blocks.

A similar problem occurs in non-spread systems, such as Long Term Evolution (LTE), where multiple users can be assigned the same channel resource (frequency subcarrier or time slot). ISI may also be caused by Multiple-Input Multiple-Output (MIMO) transmission, where non-orthogonal symbol sequences are sent from different antennas. In all cases, some form of interference suppression or equalization is needed.

One approach employing maximum likelihood detection (MLD) would hypothesize all $M^N$ possible combinations of symbols in each symbol block and form metrics to determine the most likely symbol combination, where M is the number of possible values each symbol may take and N is the number of symbols in each symbol block. However, even for blocks of three 16-QAM symbols in the HSPA uplink, the $16^3$=4096 possible symbol combinations for each symbol block renders such an approach impractical as the state-size and number of metrics to compute would be prohibitively large.

Another approach, Generalized MLSE arbitration (GMA) also referred to as Assisted Maximum Likelihood Detection (AMLD) with Single-Stage Assistance (SSA), reduces computational complexity. See U.S. patent application Ser. No. 12/035,932, which is co-owned with the instant application. In AMLD with SSA, a stage of detection assistance is performed to identify the K most likely possible symbol values for the individual symbols in each symbol block, where K<M. The sequence of symbol blocks is then detected by limiting the possible combinations of symbols hypothesized for each symbol block to those formed from the most likely possible symbol values identified in the stage of detection assistance. Thus, only $K^N$ possible combinations of symbols for a symbol block need be hypothesized when detecting the sequence of symbol blocks. In the HSPA uplink, for example, if the stage of detection assistance identifies the four most likely possible symbol values for the symbols in a symbol block, only $4^3$=64 possible combinations need be hypothesized rather than 4096.

Another approach, Multi-Stage arbitration (MSA), also reduces computational complexity. See U.S. patent application Ser. No. 12/568,036 filed on Sep. 28, 2009, which is co-owned with the instant application. MSA is a generalization of GMA, allowing for one or more stages of detection assistance, as opposed to just a single stage. For example, in MSA, there could be two stages of detection assistance: a first linear equalization stage for recovering each symbol one at a time and a second linear block equalization stage in which symbols are recovered two at a time.

What is desired is to improve upon MSA to enhance symbol block detection.

SUMMARY

Teachings presented herein offer improved symbol block detection by including a decoder in, for example, an MSA process. For example, a forward-error-correction (FEC) decoder may be added to the first stage of an MSA process and/or a second stage of the MSA process. A decoder is traditionally used to determine information bit values from soft modem bit values, but decoders can also produce modem bit likelihood values associated with modem bit values. Modem bit likelihood values can be used to construct symbol likelihood values. Accordingly, we have recognized that utilizing a decoder in an MSA process can significantly enhance symbol block detection because the decoder can produce bit likelihood values (soft bit values), and these bit likelihood values can be used to construct a set of candidate symbol values. Advantageously, this set of candidate symbol values is more likely to contain the actually transmitted symbol(s) than if the decoder was not used in the MSA process. That is, if the decoder were omitted, then the process would have to rely only on the bit likelihood values produced by a demodulator, which are not as reliable as those at the output of the decoder. Hence, using a decoder in an MSA process significantly improves the demodulation performance. It should be noted that the decoder is not necessarily used in the conventional manner of providing improved hard modem bit decisions. Instead, the modem bit likelihood values that are a by-product of decoding are used to construct improved symbol likelihood values.

Accordingly, one aspect of the invention is directed to a demodulation system (e.g., an MSA demodulation system). In some embodiments, the demodulation system includes a demodulator configured to receive a baseband signal and configured to produce modem bit likelihood values based on the received baseband signal. Advantageously, the system also includes a decoder configured to receive the modem bit likelihood values produced by the demodulator and configured to process the modem bit likelihood values to produce improved modem bit likelihood values. In some embodiments, the improved modem bit likelihood values comprise joint probabilities for sets of bits, each set of bits corresponding to a group of two or more symbols A candidate value generator is also included and is configured to receive the improved modem bit likelihood values and configured to produce, based on the improved modem bit likelihood values, candidate symbol values for a group of one or more symbols. The system also has a detector configured to receive the baseband signal and the candidate symbol values and configured to produce one of (a) final modem bit estimates and (b) candidate symbol values for a group of symbols. In some embodiments, the detector is configured to produce candidate symbol values for a group of two or more symbols. In these embodiments, the system may include a second detector. The second detector may be configured to receive the baseband signal and the candidate symbol values produced by the first detector and may be configured to produce final modem bit estimates based on the received candidate symbol values and baseband signal. Also, in these embodiments, the demodulator may comprise (i) a linear equalizer configured to receive the baseband signal and to produce, based on the baseband signal, symbol estimates and (ii) a bit level soft information generator configured to receive the symbol estimates and to produce, based on the symbol estimates, the modem bit likelihood values. The first detector may include a block linear equalizer and a joint detector. And the second detector may include a rake and an MLSE processor. The first detector may be configured to receive the improved modem bit likelihood values produced by the decoder and may be configured to use the improved modem bit likelihood values, the received base band signal, and the candidate symbol values to produce candidate symbol values for the use by the second detector.

In some embodiments, the candidate value generator is configured to receive the improved modem bit likelihood values and is configured to produce a set of candidate symbol values, each candidate symbol value corresponding to a group of two or more symbols. In such embodiments, the demodulator may include a block linear equalizer (BLE) and a joint detector (JD); and the detector may include comprises a rake and a MLSE processor.

In other embodiments, the candidate value generator comprises (a) a symbol likelihood calculator configured to receive the improved modem bit likelihood values and configured to produce symbol value likelihood information and (b) an identifier configured to identify the candidate symbol values based on the symbol value likelihood information.

In another aspect, the invention provides an improved demodulation method for producing final modem bit estimates. In some embodiments, the method begins by receiving a baseband signal. Next, modem bit likelihood values based on the received baseband signal are produced. Next, a decoder is used to process the modem bit likelihood values to produce improved modem bit likelihood values. Next, a first set of candidate symbol values is produced using the improved modem bit likelihood values. Each candidate symbol value included in the first set of candidate symbol values may correspond to a group of one or more symbols. Next, the first set of candidate symbol values and the base band signal are used to produce (i) final modem bit estimates or (ii) a second set of candidate symbol values. Each candidate symbol value included in the second set may correspond to a group of two or more symbols.

The above and other aspects and embodiments are described below with reference to the accompanying drawings.

DETAILED DESCRIPTION

Figure 1:
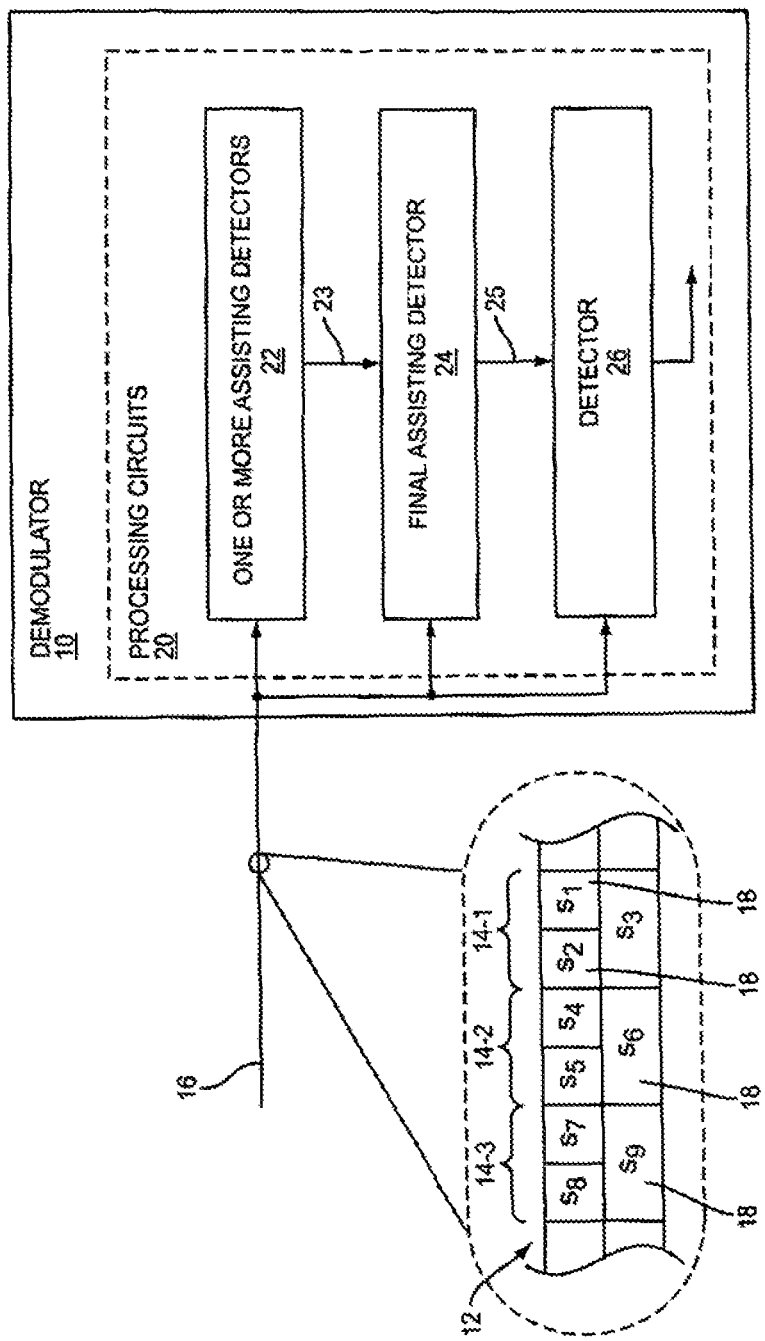
FIG. 1 is a block diagram of a demodulator according to one embodiment of the present invention.

FIG. 1 illustrates one embodiment of an MSA demodulator 10 configured to detect a time sequence 12 of symbol blocks 14 logically conveyed by a received signal 16. Each symbol block 14 comprises a combination of N symbols 18, where $N \geq 2$. As shown in FIG. 1, for example, one symbol block 14-1 comprises the combination of three symbols 18 denoted as s1, s2, and s3, while another symbol block 14-2 comprises the combination of three other symbols 18 denoted as s4, s5, and s6. Each symbol 18 may have any one of M possible values (also referred to herein as "candidate symbol values"), the set of which is defined by the modulation constellation used to form the symbols 18 for transmission.

With M possible values for each of N symbols 18 in a symbol block 14, each symbol block 14 may comprise any symbol combination within a defined set of $M^N$ possible symbol combinations (also referred to herein as "candidate symbol combinations"). To determine the symbol combination represented by each symbol block 14, and thereby detect the sequence 12 of symbol blocks 14, the MSA demodulator 10 comprises one or more processing circuits 20. The one or more processing circuits 20 may include a detector 26 and one or more assisting detectors. For example, in the particular embodiment shown, demodulator 10 includes one or more initial assisting detectors 22 and a final assisting detector 24.

In some embodiments, at least one of the one or more assisting detectors 22 is configured to either detect two or more individual symbols 18 in a symbol block 14, or to jointly detect each of two or more distinct groups of symbols 18 in a symbol block 14. By detecting symbols 18 or groups of symbols 18 in this way, the one or more assisting detectors 22 are collectively configured to identify from the defined set of $M^N$ candidate symbol combinations, for at least one symbol block 14 in the sequence 12, a reduced set 23 of $R_a$ candidate symbol value combinations. The reduced set 23 of candidate symbol value combinations identified for a symbol block 14 contains fewer candidate symbol value combinations than those in the defined set (i.e., $R_a < M^N$).

The final assisting detector 24 is configured to determine from this reduced set 23 a final reduced set 25 of $R_f$ candidate symbol value combinations for the at least one symbol block 14, which contains even fewer candidate symbol value combinations than those in the reduced set 23 (i.e., $R_f < R_a$). To do so, the final assisting detector 24 jointly detects one or more distinct groups of symbols 18 in the symbol block 14, such as by generating joint metrics associated with possible combinations of symbols within a group and comparing the joint metrics to identify the most likely symbol value combinations.

The detector 26 is configured to detect the sequence 12 of symbol blocks 14 and to generate e.g., soft bit values 88 corresponding to the sequence 12. That is, the detector 26 is configured to actually determine the candidate symbol combination represented by each of the symbol blocks 14. Instead of considering all $M^N$ candidate symbol combinations in the defined set, however, the detector 26 processes the received signal 16 in a joint detection process that limits the candidate combinations of symbols 18 considered for a symbol block 14 to the final reduced set 25 of $R_f$ candidate symbol combinations determined for that symbol block 14. In limiting the candidate combinations of symbols 18 considered by the detector 26 according to the results of the one or more assisting detectors 22 and the final assisting detector 24, these assisting detectors 22 and 24 greatly reduce the complexity of symbol block detection performed by the detector 26.

Accordingly, the one or more assisting detectors 22 and the final assisting detector 24 can be understood in some embodiments as performing two or more stages of detection assistance in succession. Each stage of detection assistance successively reduces the number of candidate symbol combinations for a symbol block 14 to be considered by the detector 26 for symbol block detection. The extent of reduction at each stage, the manner in which reduction is accomplished at each stage, and the number of stages of detection assistance (i.e., the number of assisting detectors 22), may be chosen or dynamically varied based on how many possible values exist for each symbol 18 (i.e., M) and how many symbols 18 are contained within each symbol block 14 (i.e., N).

Figure 2B:
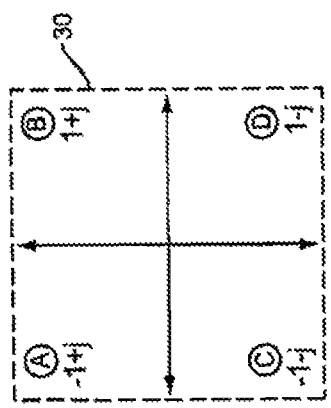
FIG. 2B is a diagram of a defined set of candidate symbol combinations for an example symbol block comprising a combination of four QPSK symbols.
Figure 2A:
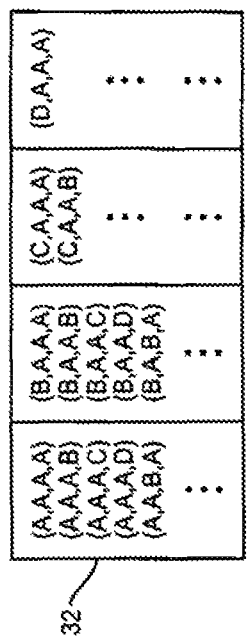
FIG. 2A is a diagram of a defined set of candidate symbol values for a symbol within an example QPSK constellation.

FIGS. 2A-2D provide a simple example of the above symbol block detection for a sequence of K symbol blocks that comprise four QPSK symbols (i.e., N=4,M=4). As shown specifically in FIG. 2A, each QPSK symbol may have any one of four possible symbol values: −1+j (labeled as 'A' for illustrative purposes), 1+j ('B'), −1−j ('C'), and 1−j ('D'). These four possible symbol values comprise a defined set 30 of M=4 candidate symbol values for each QPSK symbol. With M=4 candidate symbol values for each of N=4 symbols in a symbol block, each symbol block may comprise any symbol combination within a defined set 32 of $M^N=4^4=256$ candidate symbol combinations, as shown in FIG. 2B.

Figure 2C:
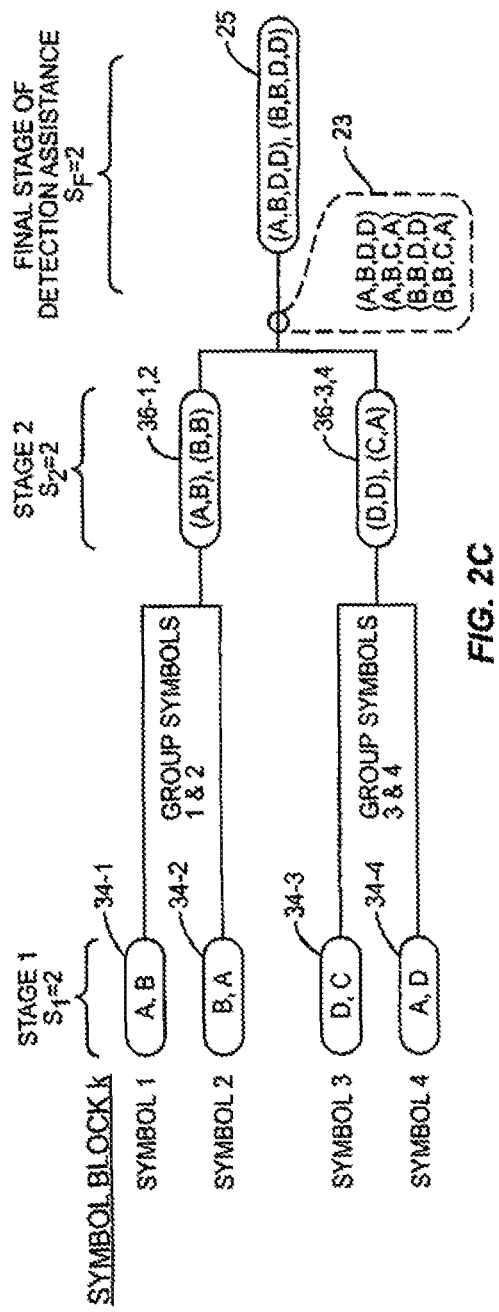
FIG. 2C is a diagram illustrating symbol block sequence detection assistance for an example symbol block according to one embodiment of the present invention.

FIG. 2C illustrates three example stages of detection assistance performed by two assisting detectors 22 and the final assisting detector 24 for one symbol block k in a sequence of K symbol blocks. A first one of the two assisting detectors 22 performs stage one, and a second one of the assisting detectors 22 performs stage two. Collectively, the two assisting detectors 22 identify from the defined set 32 of candidate symbol combinations a reduced set 23 of only $R_a=4$ candidate symbol combinations. The final assisting detector 24 then performs the final stage of detection assistance to determine from this reduced set 23 a final reduced set 25 of merely $R_f=2$ candidate symbol combinations.

More particularly, the first assisting detector 22 performing stage one detects each of the four individual symbols within the symbol block k, to identify from the defined set 30 of M=4 candidate symbol values a reduced set 34 of $S_1=2$ candidate symbol values for each symbol. In one embodiment, for example, the first assisting detector 22 determines for each of the candidate symbol values in the defined set 30 the likelihood that a symbol actually has that value, and identifies the reduced set 34 as including the $S_1=2$ most likely candidate symbol values. With regard to symbol 1, for example, the first assisting detector 22 identifies candidate symbol values A and B as the most likely symbol values for symbol 1 out of all possible symbol values A, B, C, and D. Accordingly, the first assisting detector 22 includes these values A and B in a reduced set 34-1 of candidate symbol values for that symbol. Likewise with regard to symbol 4, the first assisting detector 22 identifies candidate symbol values A and D as the most likely and includes them in a reduced set 34-4 of candidate symbol values for that symbol.

The second assisting detector 22 performing stage two jointly detects each of two distinct groups of symbols in the symbol block k, to identify a reduced set 36 of $S_2=2$ candidate symbol combinations for each group. Again, each group is distinct in that symbols 1 and 2 form one group and symbols 3 and 4 form the other group. There is no overlap. In one embodiment, for example, the second assisting detector 22 computes joint metrics associated with possible combinations of symbols within each group that can be formed using the candidate symbol values in the reduced sets 34 identified for those symbols by the first assisting detector 22 (that is, the reduced sets 36 identified at the second stage are based on the reduced sets 34 identified at the first stage). The second assisting detector 22 then compares these joint metrics to identify the $S_2=2$ most likely combinations for that group of symbols. In the example of FIG. 2C, for instance, the second assisting detector 22 jointly detects a distinct group of symbols that includes the pair of symbols 1 and 2. The combinations of symbols 1 and 2 that can be formed from the candidate symbol values in the reduced sets 34-1 and 34-2 identified for symbols 1 and 2 by the first assisting detector 22 include: (A, B), (A, A), (B, B), and (B, A). Out of these possible combinations, the second assisting detector 22 identifies the combinations (A, B) and (B, B) as the most likely. Accordingly, the second assisting detector 22 includes these combinations in the reduced set 36-1,2 of candidate symbol combinations for the group of symbols 1 and 2. Likewise, the second assisting detector 22 identifies the combinations (D, D) and (C, A) as the most likely combination of the group of symbols 3 and 4 out of those combinations that can be formed using the candidate symbol values in the reduced sets 34-3 and 34-4 identified for those symbols by the first assisting detector 22.

Having identified the $S_2=2$ candidate symbol combinations within each of the reduced sets 36-1,2 and 36-3,4 as being the most likely combinations of the two groups of symbols 1,2 and 3,4, the assisting detectors 22 thereby collectively identify the reduced set 23 of candidate symbol combinations for the symbol block k. That is, the reduced set 23 includes those $R_a=2^2=4$ combinations of symbols 1,2,3,4 that can be formed using the candidate symbol combinations in the reduced sets 36-2,1 and 36-3,4 identified for the distinct groups of symbols 1,2 and 3,4: (A,B,D,D), (A,B,C,A), (B,B,D,D), and (B,B,C,A).

The final assisting detector 24 performing the final stage of detection assistance in FIG. 2C jointly detects one distinct group of symbols that includes all four symbols in the symbol block k. In doing so, the final assisting detector 24 identifies from the reduced set 23 a final reduced set 25 of merely $S_f=2$ candidate symbol combinations for that symbol block k (because the final assisting detector 24 in this example jointly detects all symbols in the symbol block, $S_f=R_f=2$). Similar to the second assisting detector 22 described above, the final assisting detector 24 may generate a joint metric associated with each candidate symbol combination in the reduced set 23 and compare the generated joint metrics to identify a subset of the candidate symbol combinations in the reduced set 23 as being most likely. In FIG. 2C, for instance, the final assisting detector 24 identifies the candidate symbol combinations (A,B,D,D) and (B,B,D,D) within the reduced set 23 as being most likely and includes them in the final reduced set 25.

Figure 2D:
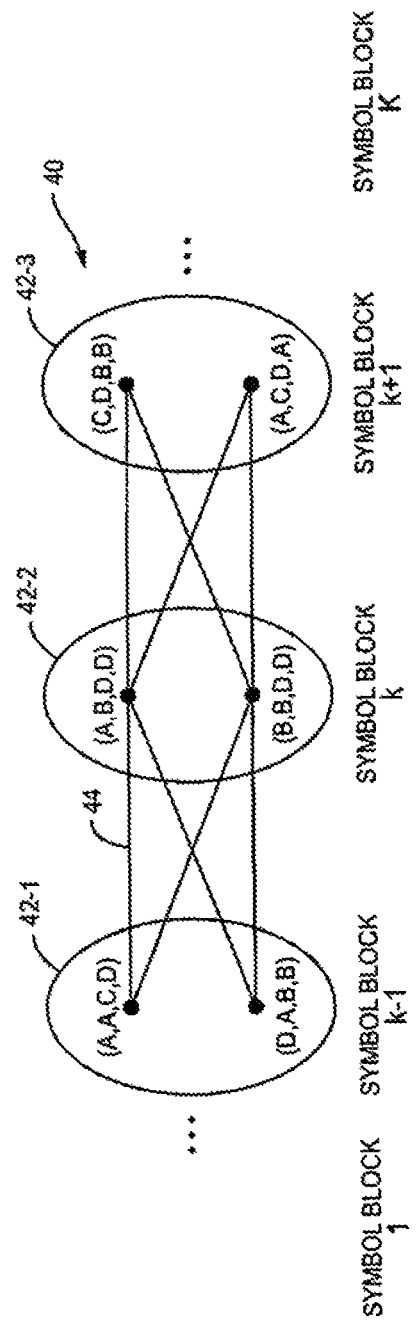
FIG. 2D is a diagram of example state spaces in a trellis according to symbol block sequence detection according to one embodiment of the present invention.

FIG. 2D continues the above example by illustrating a joint detection process performed by the detector 26 to detect the sequence of K symbol blocks. In this example, the joint detection process comprises a sequence estimation process, such as MLSE, whereby the detector 26 operates on a trellis 40. The sequence of K symbol blocks are represented in the trellis 40 by a sequence of state spaces 42-1, 42-2, and 42-3, with the state space for symbol block k from the example being 42-2. Each state space 42 comprises a final reduced set 25 of $R_f=2$ candidate symbol combinations identified for the corresponding symbol block, as compared to the defined set of $M^N=4^4=256$ candidate symbol combinations. The state space 42-2 for symbol block k, for example, is constrained to the final reduced set 25 of $R_f=2$ candidate symbol combinations identified by the final assisting detector 24 in FIG. 2C; namely (A,B,D,D) and (B,B,D,D). A particular set of branches 44 interconnecting the candidate symbol combinations through the overall sequence of state spaces 42 represents a particular symbol block sequence. The set of branches 44 interconnecting the most likely sequence of candidate symbol combinations is identified by MLSE processing of the detector 26, which in FIG. 2D considers only a reduced number of possible symbol block sequences because of the reduced size of each state space 42. This significantly reduces the computational complexity of the detector 26.

FIGS. 2A-2D, of course, represent just one example of the symbol block detection of the present invention. In this example, two assisting detectors 22 and the final assisting detector 24 collectively performed three stages of detection assistance. The assisting detector 22 performing the first stage was configured to detect two or more individual symbols 18 in a symbol block 14, to identify a reduced set 34 of candidate symbol values for each symbol 18, while the assisting detector 22 performing the second stage was configured to jointly detect each of two or more distinct groups of symbols 18 in a symbol block 14, to identify a reduced set 36 of candidate symbol combinations for each group.

Those skilled in the art will appreciate, however, that any number of detection assistance stages may be performed even for the same sequence of symbol blocks, and that any one of the assisting detectors 22 may generally either detect individual symbols 18 or jointly detect groups of symbols 18 without regard to which stage of detection assistance that assisting detector 22 may perform. That is, any or each of the one or more assisting detectors 22 may jointly detect groups of symbols 18 in a symbol block 14, even an assisting detector 22 performing a first stage of detection assistance. At least one of the assisting detectors 22, however, is configured to detect two or more individual symbols in a symbol block, or to jointly detect each of two or more distinct groups of symbols in a symbol block.

In some embodiments, for example, the one or more assisting detectors 22 and the final assisting detector 24 are configured to jointly detect progressively larger distinct groups of symbols 18 in a symbol block 14 across two or more stages of detection assistance. The distinct groups of symbols 18 jointly detected at any given stage may contain any number of symbols 18 above one, whether that number is odd or even, provided that the group contains a greater number of symbols 18 than those jointly detected in a previous stage. In one embodiment, though, the number of symbols 18 within a distinct group is kept as small as possible, such that the group of symbols 18 at any given stage of detection assistance comprises either a pair of symbols 18 in the symbol block 14, or the symbols 18 from two distinct groups of symbols 18 that were jointly detected in a previous stage of detection assistance.

An example of such an embodiment has already been provided in FIG. 2C. In FIG. 2C, a second assisting detector 22 performing the second stage of detection assistance jointly detects distinct groups of two symbols and the final assisting detector 24 performing the final stage of detection assistance jointly detects a distinct group of four symbols.

Figure 3:
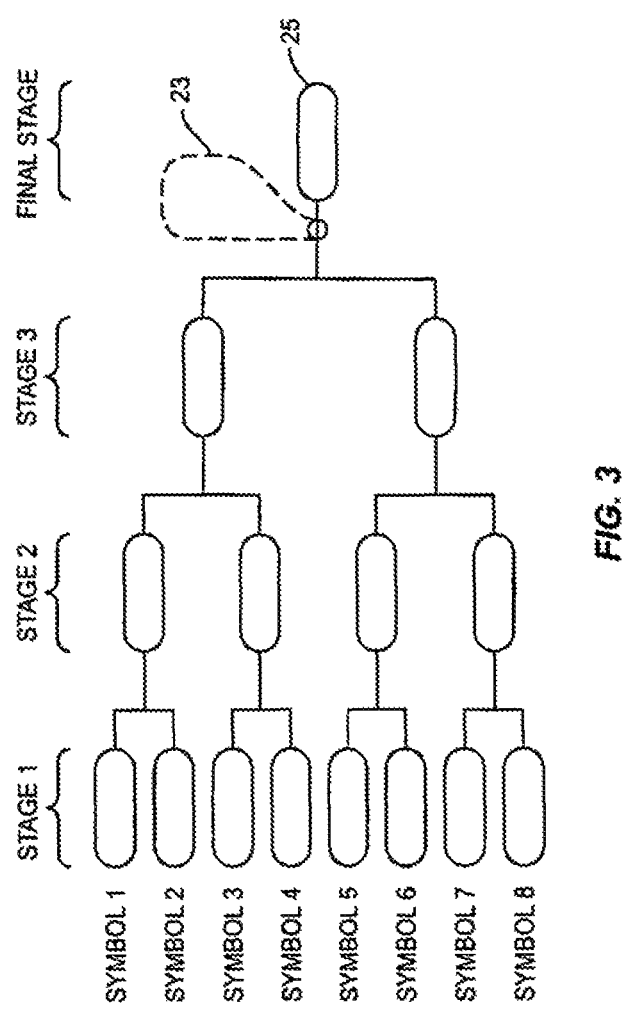
FIG. 3 is a diagram illustrating one embodiment of symbol block sequence detection assistance for an example sequence of symbol blocks that each comprises a combination of eight symbols.

FIG. 3 provides a more pronounced example with a symbol block 14 that comprises a combination of eight symbols 18. In FIG. 3, an assisting detector 22 performing a second stage of detection assistance jointly detects distinct groups of two symbols, an assisting detector 22 performing a third stage of detection assistance jointly detects distinct groups of four symbols, and the final assisting detector 24 performing a final stage of detection assistance jointly detects a distinct group of eight symbols. This embodiment, of course, may be extended for symbol blocks 14 that contain any number of symbols 18.

Figure 4:
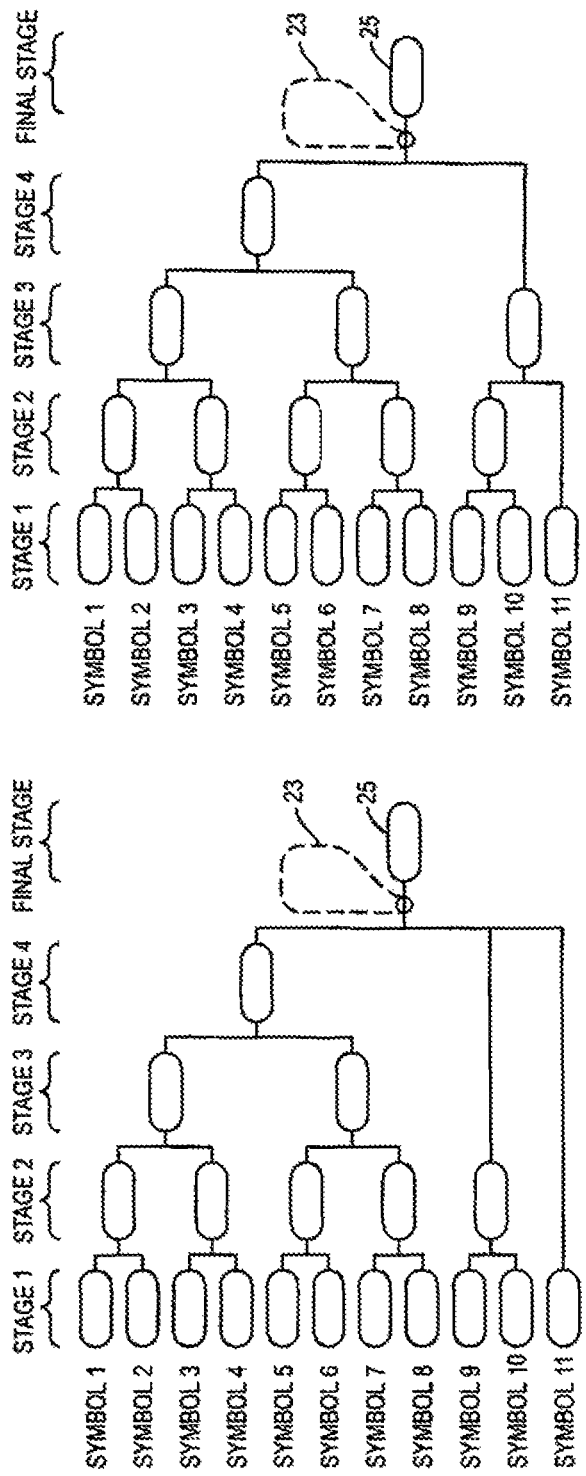
FIG. 4A is a diagram illustrating one embodiment of symbol block sequence detection assistance for an example sequence of symbol blocks that each comprises a combination of eleven symbols.
FIG. 4B is a diagram illustrating another embodiment of symbol block sequence detection assistance for an example sequence of symbol blocks that each comprises a combination of eleven symbols.

For some symbol blocks 14, however, such as those shown in FIGS. 4A and 4B, keeping the number of symbols 18 within a distinct group as small as possible may result in one symbol not being contained within any distinct group. In FIGS. 4A and 4B for instance, the assisting detector 22 performing the second stage of detection assistance is configured to jointly detect distinct groups of symbols that comprise pairs of symbols (1,2), (3,4), (5,6), (7,8), and (9,10). With only one symbol remaining, symbol 11 is not contained within any distinct group.

With symbol 11 not being contained within any distinct group, the demodulator 10 in the embodiment of FIG. 4A postpones further detection of symbol 11 until the final stage of detection assistance when all symbols are jointly detected as one large group. By postponing further detection of symbol 11, the assisting detectors 22 avoid jointly detecting groups of different numbers of symbols, thereby maximizing the sharing of any combining weights used for equalization among the groups of symbols. As a tradeoff, though, postponing further detection of symbol 11 also increases the complexity of the final assisting detector 24 performing the final stage of detection assistance, which must now consider a greater number of candidate symbol combinations for the symbols in the symbol block. Note that the fourth stage could be divided into two substages to reduce complexity, but would require even more combining weights to be computed.

To reduce the complexity of the final assisting detector 24, the one or more assisting detectors 22 in the embodiment of FIG. 4B are further configured to jointly detect a distinct group of symbols that includes (1) K symbols from one distinct group jointly detected in a previous stage; and (2) a single symbol not contained in any distinct group or M symbols where M is less than K (collectively also referred to as a partial group because the group contains fewer symbols than the distinct groups that were jointly detected in the previous stage of detection assistance). Accordingly, the assisting demodulator 22 performing the third stage of detection assistance in FIG. 4B is configured to jointly detect a distinct group of symbols that includes (1) symbols 9 and 10, which were jointly detected as a group in the second stage; and (2) symbol 11, which is not contained within any group. By merging symbol 11 into a group for joint detection in an early stage of detection assistance, the demodulator 10 in FIG. 4B reduces the number of candidate symbol combinations which must be considered at later stages of detection assistance.

Regardless of the specific manner in which the one or more assisting detectors 22 group the symbols 18 in a symbol block 14 for joint detection, the assisting detectors 22 identify the reduced set 23 of candidate symbol combinations for that symbol block 14 based on the reduced sets identified for the groups of symbols 18 and/or individual symbols 18 in the symbol block 14. More particularly, the one or more assisting detectors 22 identify the reduced set 23 as the set of combinations that can be formed using, for each symbol 18 in the symbol block 14, (1) the candidate symbol combinations in the reduced set identified for the largest distinct group of symbols 18 that contains the symbol; or (2) if the symbol is not contained in any distinct group, the candidate symbol values in the reduced set identified for the symbol.

In FIG. 4A, for example, the group of symbols 1,2,3,4,5, 6,7, and 8 jointly detected in the fourth stage of detection assistance is the largest distinct group in which any of the symbols 1-8 are jointly detected. Similarly, the group of symbols 9 and 10 jointly detected in the second stage of detection assistance is the largest distinct group in which either symbol 9 or 10 is jointly detected. Finally, symbol 11 is not contained in any distinct group. Accordingly the assisting detectors 22 in FIG. 4A identify the reduced set 23 of candidate symbol combinations for this symbol block 14 as the set of combinations that can be formed using (1) the candidate symbol combinations in the reduced set identified in the fourth stage of detection assistance for the group of symbols 1,2,3,4,5,6,7, and 8; (2) the candidate symbol combinations in the reduced set identified in the second stage of detection assistance for the group of symbols 9 and 10; and (3) the candidate symbol values in the reduced set identified in the first stage of detection assistance for symbol 11.

Furthermore, the final assisting detector 24 in the above described embodiments has identified the final reduced set 25 for a symbol block 14 by jointly detecting a group of all symbols in that symbol block 14. However, the final assisting detector 24 in other embodiments may nonetheless identify the final reduced set 25 by jointly detecting one or more distinct groups of less than all symbols in a symbol block 14. For instance, assume that the second stage of detection assistance back in the example of FIG. 2C was in fact the final stage performed by the final assisting detector 24 (meaning that the first stage was performed by a single assisting detector 22). In this case, the final assisting detector 24 jointly detects each of two distinct groups of two symbols in much the same way as the second assisting detector 22 did so in the unmodified example, to thereby identify the final reduced set 25 as the set of combinations (A,B,D,D), (A,B,C,A), (B,B,D,D), and (B,B,C,A). With the example in FIG. 2C modified in this way, the state space 42-2 for symbol block k in the sequence estimation process shown in FIG. 2D would then include all four of these combinations rather than just two combinations.

Other modifications, variations, and improvements of the above described embodiments are also contemplated by the present invention. In one embodiment, for example, an assisting detector 22 that jointly detects each of two or more distinct groups of symbols 18 in a symbol block 14 minimizes the number of computations required to identify a reduced set of candidate symbol combinations for that group. In particular, the assisting detector 22 generates joint metrics associated with candidate symbol combinations of the symbols 18 in the group and compares those joint metrics in a certain order (e.g., based upon likelihood metrics associated with the symbols 18 or groups of symbols 18 that make up the candidate symbol combinations).

In the example of FIG. 2C, for instance, the first assisting detector 22 performing the first stage of detection assistance may determine that symbol 1 is most likely to have candidate symbol value A, and next-most likely to have candidate symbol value B. The first assisting detector 22 may also determine that symbol 2 is most likely to have candidate symbol value B, and next-most likely to have candidate symbol value A. The second assisting detector 22 performing the second stage of detection assistance, therefore, generates joint metrics associated with candidate symbol combinations of symbols 1 and 2 that can be formed from the reduced sets 34-1 and 34-2 identified by the first stage: (B,B), (A,A), (A,B), and (B,A). To identify a reduced set 36-1,2 containing the most likely ones of these combinations, the second assisting detector 22 compares the joint metrics generated for the combinations in an order that is based on the likelihood determined for the individual symbols by the first stage. In one embodiment, for example, the second assisting detector 22 creates an ordered list of candidate symbol combinations with (A,B) initially assumed as most likely, (B,B) as next most likely, followed by (A,A) and then (B,A), and uses a sorting algorithm such as bubble sort or insertion sort to re-order the list, if needed, based on comparing the joint metrics generated for those combinations. As the entire list does not need to be sorted, a partial insertion sort can be used. With a partial sort, only a certain number of the best values are maintained. For example, a candidate value can be compared to the last value on the list and discarded if not better. Otherwise, it is compared to other values in the list. Other sorting approaches, such as a partial binary insertion sort, can also be used. Regardless, because the list is most likely already in order, and because the comparisons are made in an order based on the likelihood of each individual symbol determined from the first stage, the number of comparisons required for the second assisting detector 22 to identify the most likely combinations is decreased from that which would have been required otherwise. To decrease the number of comparison required even further, the second assisting detector 22 may be configured to not even consider a number of the least likely combinations (e.g., B,A).

Other variations of the above described embodiments concern the size $S_1, S_2, \ldots S_f$ of the reduced sets determined at each stage of detection assistance (whether that includes a reduced set of candidate symbol values for an individual symbol 18, a reduced set of candidate symbol combinations for a distinct group of symbols 18, the reduced set 23 of candidate symbol combinations for a symbol block 14, or the final reduced set 25). In one embodiment, the size of the reduced set(s) identified at each stage of detection assistance is fixed. In the example of FIG. 2C, for instance, the size of the reduced sets for each stage was fixed for illustrative purposes at $S_1=S_2=S_f=2$. In general, however, the size at each stage may be fixed based on a signal quality and/or delay spread experienced by an assisting detector 22, 24 at that stage. For instance, the signal quality decreases across earlier stages of detection assistance as more and more signal energy must be expended to suppress ISI, but begins to increase across later stages as other symbols 18 contributing to the ISI become part of the joint symbol being detected. Accordingly, the size of the reduced sets may be fixed to be increasingly larger across earlier stages of detection assistance and to be decreasingly smaller across later stages.

The size at each stage may alternatively be fixed based on a probability of including a correct (i.e., actually transmitted) candidate symbol value or candidate symbol combination in a reduced set identified at that stage. This probability may be determined empirically, by simulation, etc. for different possible sizes of the reduced set at a stage, and the size of the stage fixed to the minimum possible size that has a probability which meets or exceeds a target probability.

Of course, in embodiments where the size of the reduced set at each stage is fixed to a minimum size required to meet a target performance criteria, the complexity of the stages may nonetheless be restrictive. To reduce the complexity of the stages while maintaining the target performance criteria, the size of a reduced set identified by at least one stage may be fixed based on an offset above the minimum size determined for that stage. For example, by increasing the size of a reduced set identified at an earlier stage, the size of a reduced set identified at a later stage needed to meet the target performance criteria may be smaller (resulting in less computational complexity for these later stages).

Even if the size of a reduced set identified by a stage is fixed, in some embodiments, that size is adapted e.g., based on previous symbol blocks 14 detected. In one embodiment, for example, the size is adapted based on a frequency with which each candidate symbol value or candidate symbol combination in a reduced set identified by one stage of detection assistance forms part of a candidate symbol combination included in a reduced set identified by a succeeding stage of detection assistance. If the candidate symbol values or candidate symbol combinations in a reduced set identified by an earlier stage are ranked in order of likelihood, for instance, and the last ranked value or combination is rarely included in a reduced set identified by a later stage, the size of the reduced set identified by the earlier stage may be decreased. Otherwise, the size may be increased.

In other embodiments, the size of a reduced set identified by a stage is dynamically varied e.g., based on the symbol block 14 currently being detected. For instance, the size of a reduced set identified by at least one stage may be dynamically varied based on a signal quality of the received signal 16 at that stage. In this case, the size of that reduced set may be dynamically increased if the signal quality is low, and dynamically decreased if the signal quality is high.

While the above discussion has generally assumed for illustrative purposes that all reduced sets identified by a stage of detection assistance are the same size, those skilled in the art will appreciate that the sizes of the reduced sets may vary even if they are identified by the same stage. In this case, the one or more assisting detectors 22 may be configured to form distinct groups of symbols 18 for at least one stage based on the size of the reduced sets determined for symbols 18 or groups of symbols 18 at a previous stage. For a symbol block 14 comprising a combination of eight symbols 18, for example, the first stage may determine reduced sets of candidate symbol values for those symbols 18 which have sizes of: 1, 1, 2, 3, 4, 4, 5, and 7. Accordingly, an assisting detector 22 performing the second stage of detection assistance may be configured to jointly detect distinct groups of symbols 18 that are formed to pair a symbol 18 having a large reduced set with a symbol 18 having a small reduced set (e.g., pairing a symbol having a reduced set size of 1 with a symbol having a reduced set size of 7, and continuing in the same manner by pairing 1 and 5, 2 and 4, and 3 and 4).

Significant flexibility exists regarding the detailed implementation of the demodulator 10. For example, the one or more assisting detectors 22 may each comprise a RAKE receiver, a Generalized RAKE receiver (G-Rake), a Decision Feedback Equalizer (DFE), a Minimum Mean Square Error (MMSE) equalizer or a similar form of equalization adapted to process the received signal 16 on a per-symbol basis and to identify a set of possible symbol values for each symbol. The one or more assisting detectors 22 may also comprise a Block DFE (BDFE), a Block Linear Equalizer (BLE), or a similar form of equalization adapted to jointly detect a distinct group of symbols 18 in a symbol block 14 and to identify a set of possible symbol combinations for such a group. The same can be said for the final assisting detector 24, which is configured to jointly detect one or more distinct groups of symbols 18 in a symbol block 14, and the detector 26. Code-specific BDFE and BLE implementations are described in more detail in G. E. Bottomley, "Block equalization and generalized MLSE arbitration for the HSPA WCDMA uplink," IEEE VTC Fall 2008, Calgary, Canada, Sep. 21-24, 2008. This reference assumes a joint detection of all symbols transmitted in the same symbol period. It is straightforward to modify the processing weights to account for joint detection of a subset of symbols. Both code-specific and code-averaged forms are described in pending U.S. patent application Ser. No. 12/035, 846, Bottomley et al., "A Method and apparatus for block-based signal demodulation." Code-averaged forms are preferred as they are much less complex. Note that the filtering weights used depend on the number of symbols in the group being jointly detected. The detector 26, of course, may also comprise MLSE adapted to consider only a reduced number of candidate symbol combinations for each symbol block 14 in the sequence 12.

The form of equalization employed by the one or more assisting detectors 22, final assisting detector 24, and the detector 26 may even differ between symbols 18 or groups of symbols 18 within the same stage of detection assistance. Moreover, equalization may be performed at the chip level, processing chip samples from one or more receive antennas, at the symbol level, using e.g., RAKE combined or G-RAKE combined values, or even at the bit level.

Given that all or at least significant parts of equalization performed by the demodulator 10 can be implemented flexibly, the demodulator 10 may be configured to selectively perform any one or more of the above mentioned equalization processing. Such selection may adapt the equalization performed responsive to changing reception conditions (e.g., channel dispersion and/or SNR).

Figure 5:
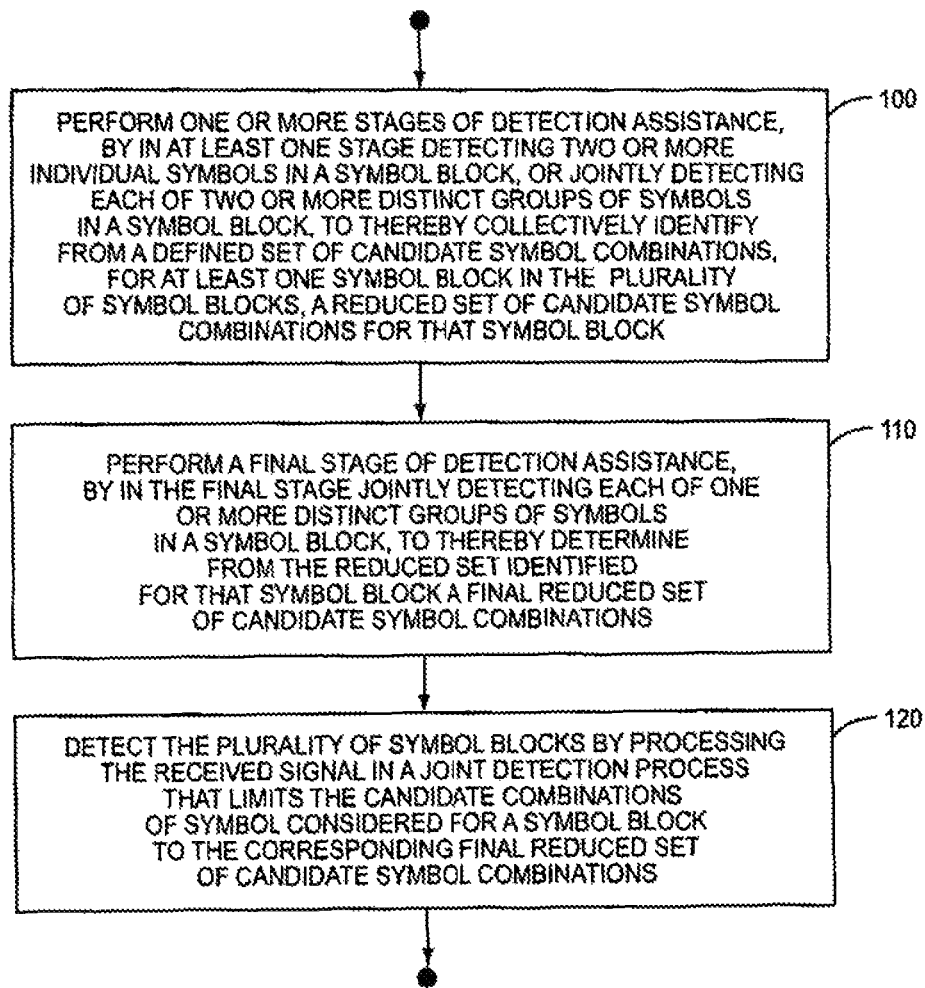
FIG. 5 is a logic flow diagram illustrating one embodiment of a method for detecting a sequence of symbol blocks according to the present invention.

With the above points of variation and implementation of the demodulator 10 in mind, those skilled in the art will appreciate that the demodulator 10 of the present invention generally performs the method illustrated in FIG. 5 to detect a plurality of symbol blocks in a received signal. According to FIG. 5, the method begins by performing one or more stages of detection assistance. In at least one of those stages of detection assistance, the method includes detecting two or more individual symbols in a symbol block, or jointly detecting each of two or more distinct groups of symbols in a symbol block. Collectively, performing the stages of detection assistance includes identifying from a defined set of candidate symbol combinations, for at least one symbol block 14 in the plurality of symbol blocks, a reduced set 23 of candidate symbol combinations for that symbol block (Block 100). The method continues with performing a final stage of detection assistance. In the final stage of detection assistance, the method includes jointly detecting each of one or more distinct groups of symbols 18 in a symbol block 14, to thereby determine from the reduced set 23 identified for that symbol block 14 a final reduced set 25 of candidate symbol combinations (Block 110). The method then continues with detecting the plurality of symbol blocks 14 by processing the received signal 16 in a joint detection process that limits the candidate combinations of symbols 18 considered for a symbol block 14 to the corresponding final reduced set 25 of candidate symbol combinations (Block 120). In limiting the candidate combinations of symbols 18 considered for a symbol block 14, the method greatly reduces the computational complexity of symbol block detection.

The significant reduction in symbol block detection computational complexity gained from the present invention can be particularly beneficial for received signal processing in wireless communication contexts, although the invention is not limited to such applications. While described for a CDMA system, in which a time sequence of symbol blocks are detected, the invention applies to sequences in code, subcarriers, and space. It also applies to combinations of different types of sequences. Thus, in general, the invention applies to a plurality of symbol blocks. For example, in the downlink of the LTE system, MIMO is used. While there may be no ISI between different blocks of symbols in time, there is ISI in space, between symbols sent from different transmit antennas or beams. With 4×4 MIMO, for example, there is ISI within groups of 4 symbols. In this case, the first detection assistance stage may detect each of four individual symbols, and the final detection assistance stage may jointly detect each of two groups of two symbols each. The detector 26 may then jointly detect a group of all four symbols.

Regardless, determining processing weights for joint detection of symbol subsets is well understood; See, for example, V. Tarokh, A. Naguib, N. Seshadri and A. R. Calderbank, "Combined array processing and space-time coding," IEEE Trans. Info. Theory, vol. 45, no. 4, pp. 1121-1128, May 1999. Note that in the final stage of detection assistance, the forming of the one or more groups of symbols for joint detection may not be random. It would be advantageous, for instance, to pair symbols that interfere more with one another. This can be determined using a channel matrix as described in X. Li, H. C. Huang, A. Lozano, and G. J. Foschini, "Reduced-complexity detection algorithms for systems using multi-element arrays," in Proc. IEEE Globecom, San Francisco, Nov. 17-Dec. 1, 2000, pp. 1072-1076.

Another example is the LTE uplink, in which a single-carrier approach is used. The approach effectively transmits symbols one at a time sequentially in time. In this case, a symbol block may be defined as 4 sequential symbols (e.g, symbols 1, 2, 3, 4 is one block, symbols 5, 6, 7 and 8 is another block, and so on). Formation of combining weights for a BDFE in this case is described in D. Williamson, R. A. Kennedy, and G. W. Pulford, "Block decision feedback equalization," IEEE Trans. Commun.}, vol. 40, no. 2, pp. 255-264, February 1992.

In general, therefore, a symbol block as used herein may include the combination of two or more symbols sent in parallel using different orthogonal codes, two or more symbols sent from different antennas, or two or more symbols transmitted in a time interval of interest.

Figure 6:
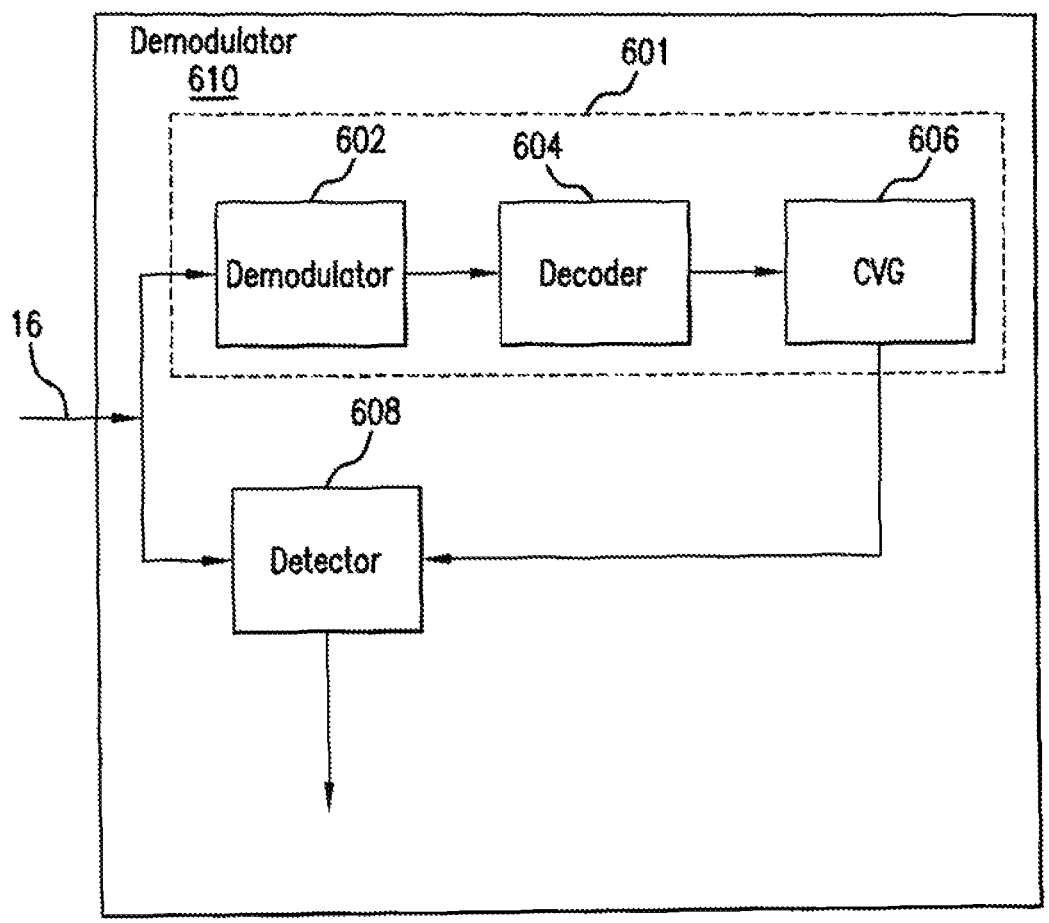
FIGS. 6-9 are block diagrams of a demodulator according to various embodiments of the invention.

Referring now to FIG. 6, FIG. 6 illustrates a portion of an improved MSA demodulator 610. As shown in FIG. 6, demodulator 610 includes an assisting detector 601 and a detector 608. Assisting detector 601 may function as an initial assisting detector 22 or a final assisting detector 24. Similarly, detector 608 may function as a final assisting detector 24 or detector 26. As further shown in FIG. 6, assisting detector 601, in some embodiments, includes: a demodulator 602, a decoder 604 (e.g., a FEC decoder), and a candidate value generator (CVG) 606. Demodulator 602 may comprise a RAKE receiver, a G-Rake, a DFE, a MMSE or a similar form of equalization. Demodulator 602, as is known in the art, receives signal 16, which is preferably a digital baseband signal, and produces modem bit estimates and modem bit likelihood information (sometimes referred to as "a priori probabilities" or "APPs") based on signal 16. Decoder 604 is configured to receive the modem bit likelihood information and process the modem bit likelihood information to produce improved modem bit likelihood values. CVG 606 is configured to receive the improved modem bit likelihood values and is configured to select, based on the improved modem bit likelihood values, candidate symbol values for a group of one or more symbols. Thus, CVG 606 may also be referred to as "candidate value selector (CLS)". By including a decoder in the MSA process, better candidate values can be obtained. In some embodiments where the decoder is used in the second stage of an MSA process, the improved modem bit likelihood values include joint probabilities for sets of bits, where each set of bits corresponds to a group of two or more symbols.

Figure 7:
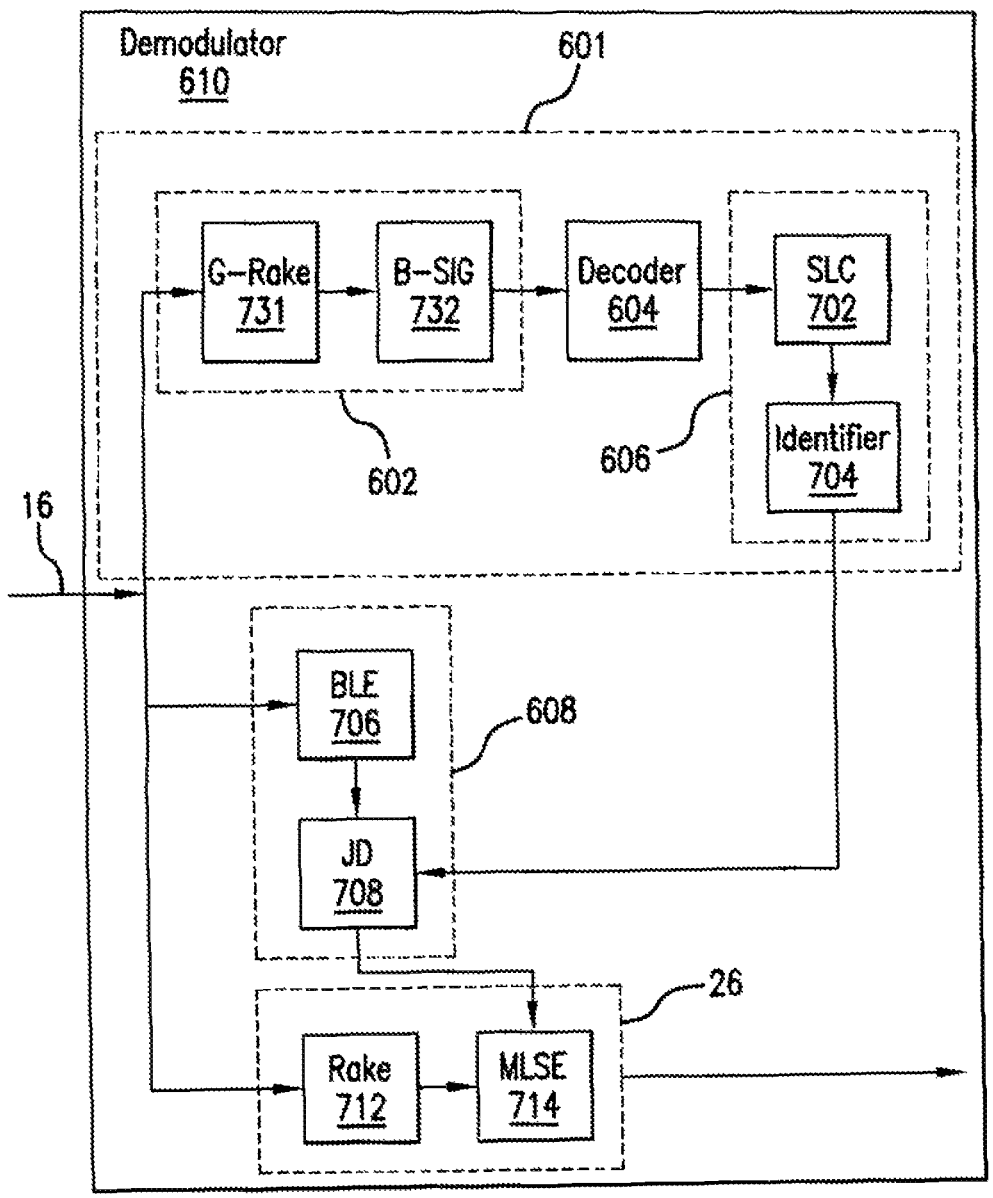

Referring now to FIG. 7, FIG. 7 further illustrates MSA demodulator 610 according to some embodiments. More specifically, FIG. 7 further illustrates demodulator 602, CVG 606 and detector 608. FIG. 7 also shows that MSA demodulator 610 may have three stages: a first assisting detector 601, a final assisting detector 608, and detector 26.

As shown in FIG. 7, demodulator 602 may include an equalizer 731 (e.g., a linear equalizer, such as a G-Rake, or other equalizer) and a bit-level soft information generator (B-SIG) 732. Equalizer 731 is configured to receive the baseband signal 16 and to produce, based on the baseband signal 16, symbol estimates. B-SIG 732 is configured to receive the symbol estimates and to produce, based on the symbol estimates, modem bit likelihood values (e.g., soft bit values, such as likelihood ratios, to be used by decoder 604).

As further shown in FIG. 7, CVG 606 may include a symbol likelihood calculator (SLC) 702 and an identifier 704. SLC 702 is configured to receive the improved modem bit likelihood values produced by decoder 604 and produce symbol value likelihood information based on the improved modem bit likelihood values. Identifier 704 is configured to select and output candidate symbol values based on the symbol value likelihood information. For example, identifier 704 may include a sorting function to sort the candidate symbol values based in the likelihood information so that identifier 704 can identify, select and output the candidate symbol values having the highest likelihood. As also shown in FIG. 7, detector 608 may include a BLE 706 (or similar module) and a joint detector (JD) 708 and detector 26 may include an equalizer (e.g. a Rake) 712 and an MLSE processor 714. In the embodiment shown in FIG. 7, demodulator 610 is a three stage improved MSA demodulator. That is, detector 601 is an improved initial assisting detector that utilizes a decoder to determine the candidate symbol values and detector 608 is a final assisting detector 24. As explained herein, detector 608 receives baseband signal 16 and the candidate symbol values output by CVG 606 and is configured to produce candidate symbol values for a group of two or more symbols (i.e., candidate symbol combinations); and detector 26 receives baseband signal 16 and the candidate symbol values produced by detector 608 and is configured to produce final modem bit estimates based on the received candidate symbol values and baseband signal 16.

Figure 8:
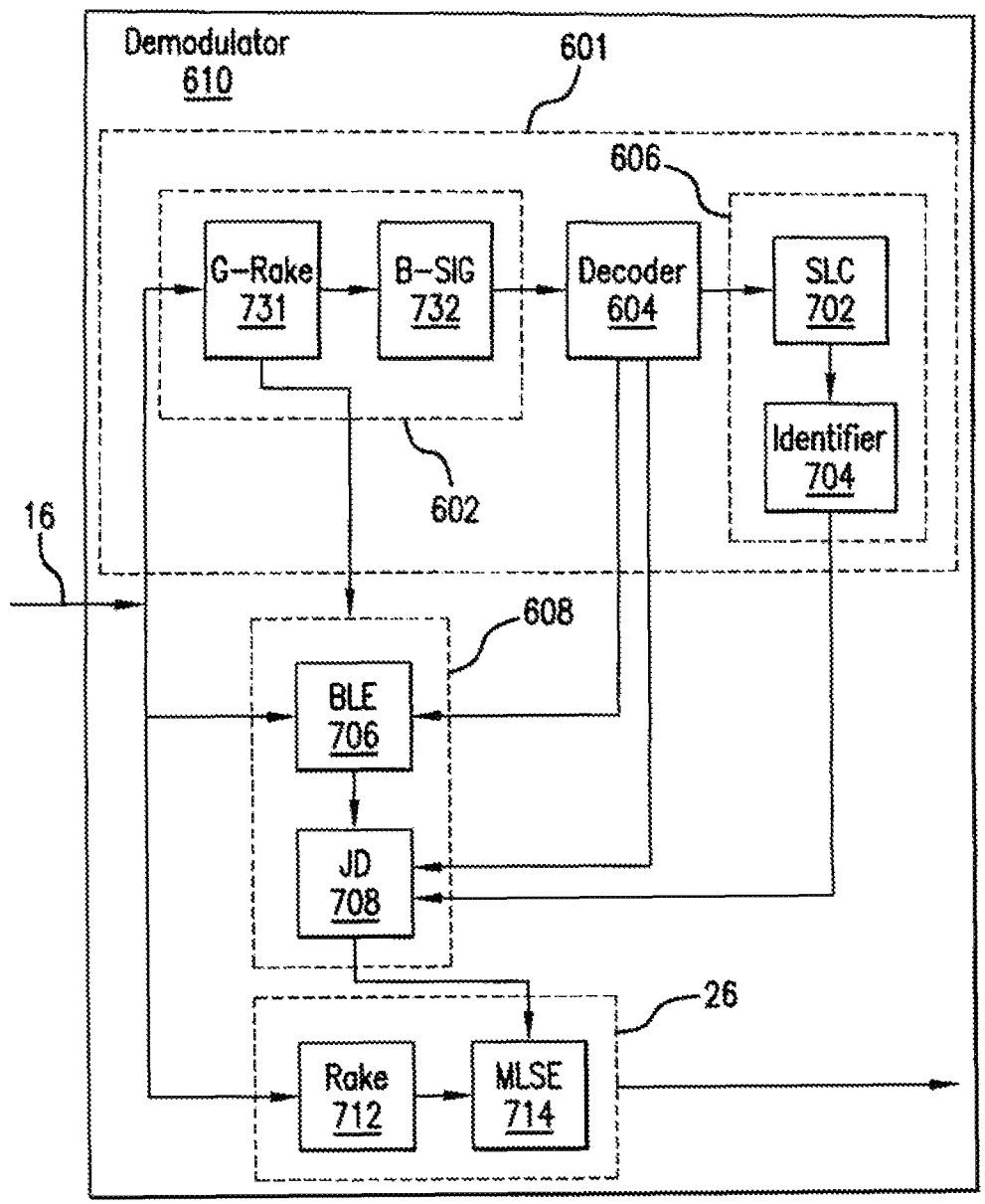

Referring now to FIG. 8, FIG. 8 shows that, in some embodiments, the improved modem bit likelihood values produced and output by decoder 604 may be received by detector 608. For example, the improved modem bit likelihood values may be received by BLE 706 and/or JD 708. In this embodiment, assisting detector 608 is configured to use the improved modem bit likelihood values, the candidate symbol values identified by CVG 606, and baseband signal 16 to produce the candidate symbol values for use by detector 26. Detector 608 may use the improved modem bit likelihood values in at least two ways. One use is to softly subtract interference from symbols not in the block of interest (not being jointly detected). The process follows linear turbo equalization, in which mean symbol values are used for subtraction. A second use is to bias the joint detector for symbols within the block of interest. The process follows nonlinear turbo equalization, in which a priori symbol likelihoods are used in the joint detector. If only the first approach is used, an enhanced form of linear turbo equalization results. If only the second approach is used, an enhanced form of nonlinear turbo equalization results. If both are used, a hybrid form of turbo equalization results. A similar hybrid form can be found in U.S. Patent Application Publication No. 20070147481, in which extrinsic bit information is used to both softly subtract symbols and to bias symbol detection. It is possible to use the extrinsic information and omit the CVG 608. In this case the N-best values are obtained at the output of G-Rake 731.

Figure 9:
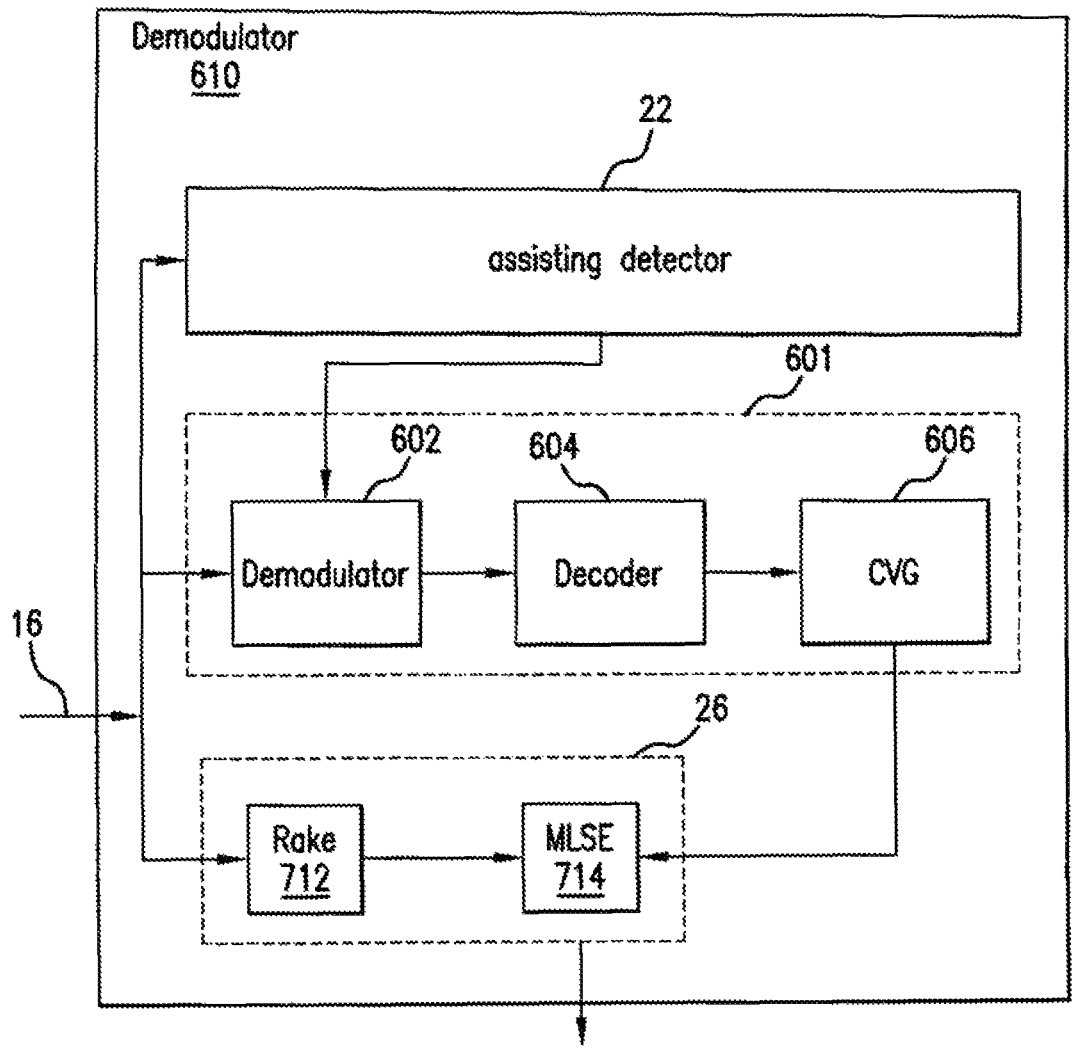

Referring now to FIG. 9, FIG. 9 further illustrates MSA demodulator 610 according to some embodiments. In the embodiment shown in FIG. 9, MSA demodulator 610 is a three stage demodulator having an assisting detector 22, improved assisting detector 601, which functions as the final assisting detector, and a detector 26. In the embodiments shown in FIG. 9, demodulator 602 may include a BLE and a JD; and CVG 606 is configured to receive the improved modem bit likelihood values from decoder 604 and to produce a set of candidate symbol values, where each candidate symbol value corresponds to a group of two or more symbols.

Figure 10:
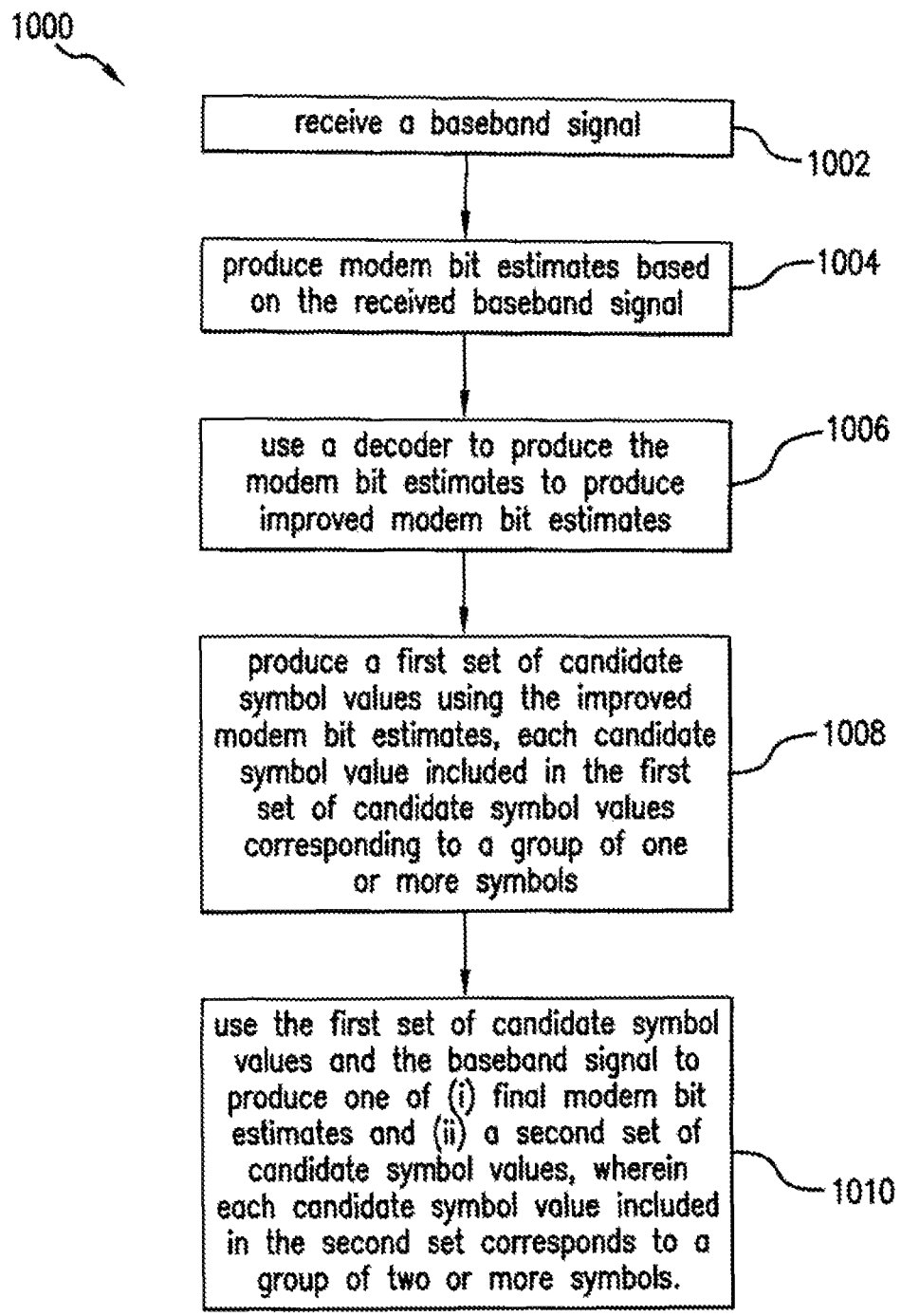
FIG. 10 is a flow chart illustrating a demodulation process according to an embodiment of the invention.

Referring now to FIG. 10, FIG. 10 is a flow chart illustrating a demodulation process 1000 according to some embodiments of the invention. Process 1000 may begin in step 1002, where, demodulator 610 receives a baseband signal. In step 1004, modem bit likelihood values based on the received baseband signal are produced. In step 1006, a decoder is used to process the modem bit likelihood values to produce improved modem bit likelihood values. In step 1008, a first set of candidate symbol values using the improved modem bit likelihood values is produced, where each candidate symbol value included in the first set of candidate symbol values corresponding to a group of one or more symbols. In step 1010, the first set of candidate symbol values and the base band signal are used to produce (i) final modem bit estimates or (ii) a second set of candidate symbol values, wherein each candidate symbol value included in the second set corresponds to a group of two or more symbols.

Figure 11:
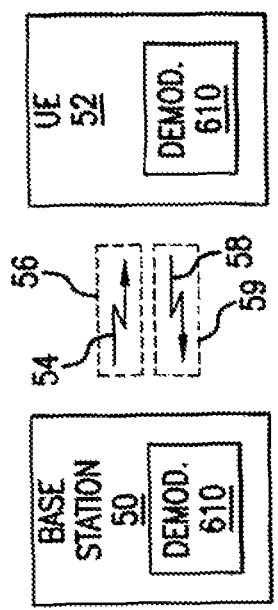
FIG. 11 is a block diagram of a wireless communication network base station and corresponding user equipment, either or both of which may be configured with demodulation circuits of the present invention.

In view of the above described variations, FIG. 11 illustrates a base station 50 for use in a wireless communication network, for supporting wireless communications with a user equipment (UE) 52. The base station 50 comprises, for example, a WCDMA, LTE, CMDA2000 or other type of base station, and the UE 52 comprises a cellular radiotelephone, pager, network access card, computer, PDA, or other type of wireless communication device.

In one embodiment, the UE 52 includes an embodiment of the demodulator 610 as taught herein, for processing downlink signals 54 transmitted by the base station 50 over a time-dispersive channel 56. Additionally or alternatively, the base station 50 includes an embodiment of the demodulator 610 as taught herein, for processing uplink signals 58 transmitted by the UE over a time-dispersive channel 59, which may or may not be the same as the channel 56.

Figure 12:
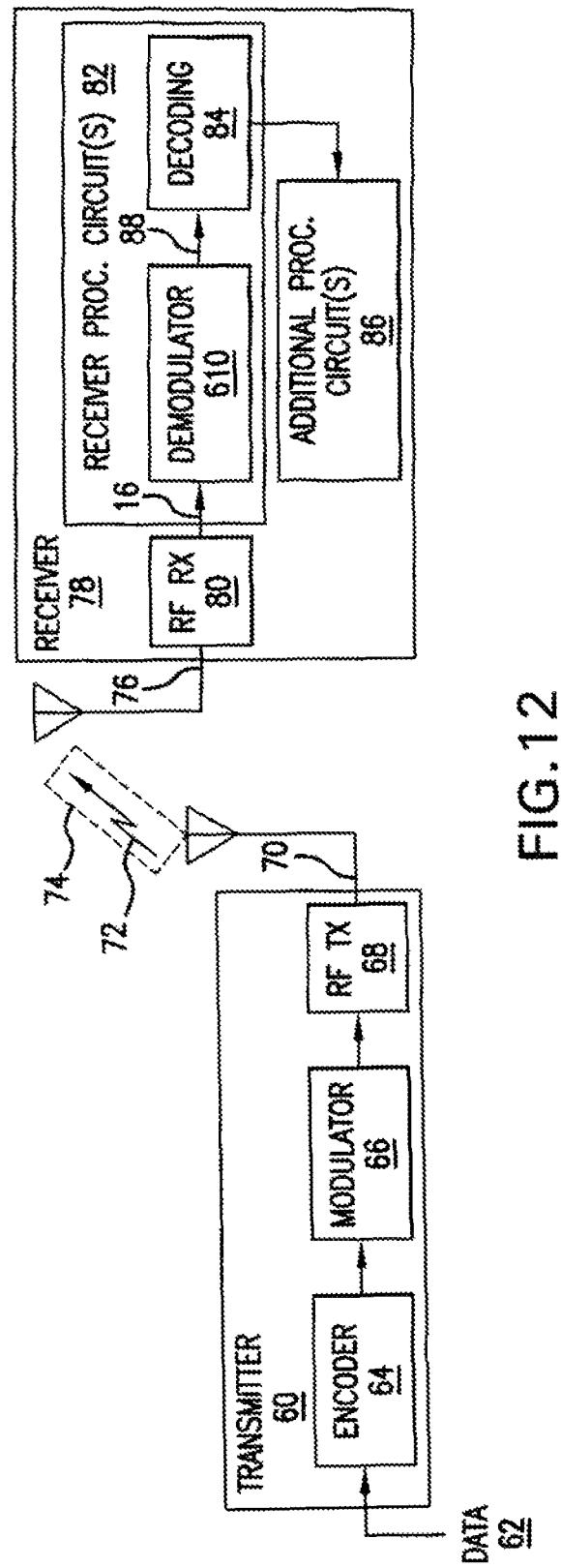
FIG. 12 is a block diagram of one embodiment of a transmitter and receiver, where the receiver is configured with demodulation circuits according to the teachings herein.

FIG. 12 provides a more detailed but non-limiting transmitter/receiver example. At a transmitter 60, information symbols 62 are optionally encoded using a forward-error-correction (FEC) encoder 64, such as a convolutional encoder or turbo-code encoder. The resulting modem bits are provided to a modulator 66, where modem symbols are formed (e.g. QPSK, 16-QAM) and used to modulate waveforms such as spreading waveforms or OFDM subcarriers. The modem symbols can be pre-coded via a Discrete Fourier Transform before being modulated on OFDM subcarriers, like the case in the uplink of LTE. The resulting signal is then modulated onto a radio carrier in RF transmit circuits 68, and transmitted on one or more transmit antennas 70. The transmitted signal 72 passes through a transmission medium 74, such as a multipath fading channel, and arrives at one or more receive antennas 76 at a receiver 78. The received signals are processed by a front-end RF circuit 80, which mixes them down to baseband and digitizes them to form a baseband signal that, in this embodiment, represents the earlier identified received signal 16. The received signal values comprising the received signal 16 thus represent or otherwise convey a given sequence 12 of symbol blocks 14.

Receiver processing circuits 82 include an embodiment of the demodulator 610, which may be configured to process the received signal 16. For example, as taught herein, the demodulator 610 may include a detector 601, which may function as an assisting detector, a detector 608, which may function as a final assisting detector, and a detector 26. At least one of the assisting detectors detects two or more individual symbols 18 in a symbol block 14, or jointly detects each of two or more distinct groups of symbols 18 in a symbol block 14. The detector 601 may identify from a defined set of candidate symbol combinations, for at least one symbol block 14 in the sequence 12, a reduced set of candidate symbol combinations. The final assisting detector 608 then jointly detects each of one or more distinct groups of symbols 18 in a symbol block 14, to thereby determine from the reduced set identified for that symbol block a final reduced set of candidate symbol combinations. Finally, the detector 26 detects the sequence 12 of symbol blocks 14 by processing the received signal 16 in a joint detection process that limits the candidate combinations of symbols 18 considered for a symbol block 14 to the final reduced set of candidate symbol combinations determined for that symbol block 14.

In doing so, the demodulator 610 may generate soft bit values 88 for the symbols 18 in the sequence 12 of symbol blocks 14. Soft bit values 88 indicate information about the reliability of the bits detected. The detector 26 may generate soft bit values 88, for example, in accordance with a Soft- Output Viterbi Algorithm (SOVA), as described by J. Hagenauer and P. Hoeher, "A Viterbi Algorithm with Soft-Decision Outputs and its Applications," in Proc. Globecom, Dallas Tes., Nov. 27-30, 1989. In this case, the detector 26 generates soft bit values 88 based on the difference between (1) a metric computed for the detected symbol block sequence (which includes the detected bit value for a particular bit represented in the sequence); and (2) a metric computed for a non-detected symbol block sequence that includes a bit value complementary to the detected bit value for that particular bit.

Yet because the detector 26 of the present invention does not consider all candidate combinations of symbols 18 for a symbol block 14, the detector 26 may not consider or otherwise compute a metric for a non-detected symbol block sequence that includes a bit value complementary to a detected bit value. Accordingly, the detector 26 may also generate soft bit values 88 using other known approaches, such as those described by H. Arslan and D. Hui, "Soft Bit Generation for Reduced-State Equalization in EDGE," in Proc. Wireless Communications and Networking Conference, Mar. 20, 2003, pp. 816-820, and N. Seshadri and P. Hoeher, "On Post-Decision Symbol-Reliability Generation," IEEE International Conference on Communications, Geneva, May 23-26,1993.

In one embodiment, for instance, the detector 26 performs a first joint detection process to generate some of the soft bit values 88 and performs a second joint detection process to generate the remaining soft bit values 88. Specifically, the detector 26 in the first joint detection process detects the symbol block sequence by limiting the number of possible symbol block sequences considered (e.g., by forming state spaces in a trellis from the most likely symbol blocks). The possible symbol block sequences considered may or may not include bit values complementary to the detected bit values. The detector 26, therefore, generates soft bit values 88 for those detected bit values that do have complementary bit values represented by the possible sequences.

In the second joint detection process, the detector 26 limits the possible symbol block sequences considered to the detected symbol block sequence and those possible sequences that have bit values complementary to the detected bit values (e.g., by forming state spaces in a trellis from the symbol blocks included in the detected sequence and those that have one or more bit values complementary to the detected bit values, even if they are not the most likely). The trellis is much simpler, in that only paths needed for soft bit detection are generated, i.e., those that deviate and return to the detected path giving a single bit flip. Based on metrics computed for these possible symbol block sequences, the detector 26 generates the remaining soft bit values 88; namely, those for the detected bit values that did not have complementary bit values represented in the first joint detection process. Of course, the detector 26 in the second joint detection process may also generate additional soft bit values 88 for the detected bit values that did have complementary bit values represented in the first process. In this case, the detector 26 may select which soft bit value 88 to use for a particular detected bit value e.g., based on which one indicates greater reliability.

Regardless of the specific manner in which they are generated, the soft bit values 88 are output by the demodulator 610 and input to a decoding circuit 84. The decoding circuit 84 decodes the detected symbols 18 based on the provided soft bit values 88 to recover the originally transmitted information. The decoding circuit 84 outputs such information to one or more additional processing circuits 86, for further operations. The nature of the additional processing circuits varies with the intended function or purpose of the receiver 78, e.g., base station circuit, mobile terminal circuit, etc., and it should be understood more generally that the illustrated architecture of the receiver 78 is non-limiting.

While various embodiments of the present invention have been described above, it should be understood that they have been presented by way of example only, and not limitation. Thus, the breadth and scope of the present invention should not be limited by any of the above described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A demodulation system, comprising:
    a first detector configured to receive a signal and configured to output, based on the received signal, first candidate symbol values (CSVs) for a group of symbols; and
    a second detector configured to: (i) receive the signal and the first CSVs and (ii) use the received signal from the second detector and the received first CSVs to produce one of (a) final modem bit estimates and (b) second CSVs for a group of symbols, wherein the first detector comprises:
    a demodulator configured to receive the signal and produce modem bit likelihood values based on the received signal from the demodulator; and
    a decoder configured to receive the modem bit likelihood values produced by the demodulator and configured to use the modem bit likelihood values to produce improved modem bit likelihood values.

2. The demodulation system of claim 1, wherein the second detector is configured to produce the second CSVs; and
    the demodulation system further comprises a third detector that is configured to: (i) receive the signal and the second CSVs and (ii) produce the final modem bit estimates based on the second CSVs and the signal.

3. The demodulation system of claim 2, wherein
    the demodulator comprises (i) a linear equalizer configured to receive the signal which is a baseband signal and to produce, based on the baseband signal, symbol estimates and (ii) a bit level soft information generator configured to receive the symbol estimates and to produce, based on the symbol estimates, the modem bit likelihood values;
    the second detector comprises a block linear equalizer and a joint detector; and
    the third detector comprises a rake and a MLSE processor.

4. The demodulation system of claim 2, wherein the second detector is configured to receive the improved modem bit likelihood values produced by the decoder and is configured to use the improved modem bit likelihood values, the signal, and the first CSVs to produce the second CSVs.

5. The demodulation system of claim 2, wherein
    the second detector comprises a block linear equalizer (BLE) and a joint detector (JD); and
    the third detector comprises a rake and a MLSE processor.

6. The demodulation system of claim 2, wherein the first detector further comprises:
- a symbol likelihood calculator configured to receive the improved modem bit likelihood values and configured to produce symbol value likelihood information; and
- an identifier configured to select CSVs based on the symbol value likelihood information and output the selected CSVs as the first CSVs.

7. A mobile station or a base station comprising the demodulation system of claim 1.

8. A demodulation method for producing final modem bit estimates, comprising:
- (a) receiving a signal;
- (b) producing modem bit likelihood values based on the received signal;
- (c) producing improved modem bit likelihood values using the modem bit likelihood values;
- (d) producing a first set of candidate symbol values (CSVs) using the improved modem bit likelihood values; and
- (e) using the first set of CSVs and the signal to produce one of (i) the final modem bit estimates estimates and (ii) a second set of CSVs.

9. The demodulation method of claim 8, further comprising:
- receiving the signal and the second set of CSVs; and
- producing the final modem bit estimates based on the second set of CSVs and the signal.

10. The demodulation method of claim 8, wherein
- the signal is received by a linear equalizer that is configured to produce symbol estimates based on the received signal;
- the method further comprises using the symbol estimates to produce the modem bit likelihood values; and
- step (e) is performed by a system comprising a block linear equalizer and a joint detector.

11. The demodulation method of claim 8, wherein the improved modem bit likelihood values joint probabilities for sets of bits, each set of bits corresponding to a group of two or more symbols.

12. The demodulation method of claim 8, wherein step (c) comprises using a decoder to process the modem bit likelihood values to produce the improved modem bit likelihood values.

13. The demodulation method of claim 8, wherein
- each CSV included in the first set of CSVs corresponds to a group of one or more symbols, and
- each CSV included in the second set of CSVs corresponds to a group of two or more symbols.

\* \* \* \* \*

UNITED STATES PATENT AND TRADEMARK OFFICE
CERTIFICATE OF CORRECTION

| | | |
|---|---|---|
| PATENT NO. | : 8,630,372 B2 | |
| APPLICATION NO. | : 13/594191 | |
| DATED | : January 14, 2014 | |
| INVENTOR(S) | : Grant et al. | |

It is certified that error appears in the above-identified patent and that said Letters Patent is hereby corrected as shown below:

In the Specification

In Column 14, Line 2, delete "Commun.}," and insert -- Commun., --, therefor.

In Column 15, Line 40, delete "CVG 608." and insert -- CVG 606. --, therefor.

In Column 16, Line 7, delete "CMDA2000" and insert -- CDMA2000 --, therefor.

In the Claims

In Column 19, Line 21, in Claim 8, delete "estimates estimates" and insert -- estimates --, therefor.

In Column 20, Line 12, in Claim 11, delete "values joint" and insert -- values comprise joint --, therefor.

Signed and Sealed this
Eighth Day of July, 2014

Michelle K. Lee
*Deputy Director of the United States Patent and Trademark Office*